(12) United States Patent
Archambault et al.

(10) Patent No.: US 6,354,933 B1
(45) Date of Patent: Mar. 12, 2002

(54) MEAT DEBONING APPARATUS AND METHOD

(75) Inventors: Réal Archambault, Terrebonne; Robert Daoust, Boucherville; Serge Garneau, St-Jean Chrysostome, all of (CA)

(73) Assignee: Centre de Recherche Industrielle du Quebec, Quëbec (CA)

( * ) Notice: Subject to any disclaimer, the term of this patent is extended or adjusted under 35 U.S.C. 154(b) by 0 days.

(21) Appl. No.: 09/563,261

(22) Filed: May 1, 2000

(51) Int. Cl.$^7$ .............................................. A22C 17/02
(52) U.S. Cl. ...................................... 452/135; 452/171
(58) Field of Search ............................... 452/135, 136, 452/170, 171

(56) References Cited

U.S. PATENT DOCUMENTS

| | | | |
|---|---|---|---|
| 3,159,869 A | | 12/1964 | N.H. Vogt et al. |
| 3,581,336 A | * | 6/1971 | Herubel ...................... 452/136 |
| 3,982,299 A | | 9/1976 | Kompan |
| 4,134,181 A | | 1/1979 | Schneider, Jr. |
| 4,189,806 A | | 2/1980 | Van Heyningen |
| 4,662,029 A | | 5/1987 | Helsene et al. |
| 4,979,269 A | | 12/1990 | Norrie |
| 5,173,077 A | * | 12/1992 | van den Nieuwelaar .... 452/135 |
| 5,407,384 A | | 4/1995 | Boody et al. |
| 5,462,477 A | * | 10/1995 | Ketels ........................ 452/135 |
| 5,542,879 A | * | 8/1996 | Kunig et al. ................ 452/135 |
| 5,746,648 A | | 5/1998 | Boeyen et al. |
| 5,813,905 A | * | 9/1998 | Boeijen et al. ............. 452/135 |
| 5,882,252 A | | 3/1999 | Boody et al. |
| 6,155,919 A | * | 12/2000 | Haagensen et al. ......... 452/136 |

FOREIGN PATENT DOCUMENTS

| DK | DK 9600326 | 3/1996 |
|---|---|---|
| EP | 0 894 438 A2 | 2/1999 |

* cited by examiner

*Primary Examiner*—Willis Little
(74) *Attorney, Agent, or Firm*—Swabey Ogilvy Renault; Guy J. Houle

(57) ABSTRACT

An apparatus for deboning a piece of meat having an elongate bone portion, such as a loin piece provided with a spine portion, comprises an elongate support mounted on a frame for receiving the loin its spine portion being substantially aligned with a longitudinal axis defined by the support, and a plurality of press devices mounted on the frame for maintaining the piece of meat in a predetermined cutting position on the support. A first embodiment makes use of a cutting tool including an elongate shearing knife having a base portion pivotally mounted on the frame and an inwardly arcuate section defining a longitudinally extending cutting edge. The cutting tool further includes an actuating device mounted on the frame for selectively controlling pivotal movement of the knife between a first position allowing the loin to be disposed in the predetermined cutting position on the support and a second position wherein the spine portion is separated from the deboned meat piece following travel of the cutting edge through the meat piece according to a curvilinear cutting path transversely extending about the longitudinal axis. A second embodiment makes use of a cutting tool including a pair of elongate shearing knives having respective base portions pivotally mounted on the frame, and having respective inwardly arcuate sections defining longitudinally extending opposed cutting edges. The cutting tool further includes an actuating device mounted on the frame for selectively controlling pivotal movement of the knives between a tool open position wherein the knives are in a spaced relationship allowing the loin to be disposed in the predetermined cutting position on the support means and a tool closed position wherein the opposed cutting edges are brought into contact to separate the spine portion from the deboned loin following respective travels of the cutting edges through the loin according to convergent curvilinear cutting paths transversely extending about the longitudinal axis.

19 Claims, 14 Drawing Sheets

MEAT DEBONING APPARATUS AND METHOD

FIELD OF THE INVENTION

The present invention relates to the field of meat processing, and more particularly to apparatus and methods for deboning a piece of meat having an elongate bone portion such as a hog carcass middle or loin.

BACKGROUND OF THE INVENTION

In slaughterhouses, after eviscerating, beheading and chilling, animal carcasses are, as a first primal cutting step, separated through the backbone in two carcass halves, each being then further processed to obtain other primal cuts. In pork slaughtering, such further primal cuts include hind and front foot, ham, shoulder and a remaining portion commonly referred to as the "middle" which includes loin and belly portions with ribs attached thereto, each of these meat portions being provided with a layer of back fat. To further subdivide the middle, a manual method commonly used in slaughterhouses consists of cutting the ribs at a predetermined loin/flank separation area along a direction generally parallel to the backbone with a cutting tool commonly referred to as a "scribe saw", and then manually removing the loin portion from the middle while leaving most of the back fat behind by pulling a hand tool provided with an elongate blade or thread secured at both ends thereof to a pair of handles, which blade or thread extends through the opening or kerf provided by the scribe saw. Alternatively, automated apparatus commonly known as "middle splitters" can be used for separating the loin and belly portions of the middles, such as those disclosed in U.S. Pat. No. 3,159,869 issued on Dec. 8, 1964 to Vogt et al., in U.S. Pat. No. 4,662,029 issued on May 5, 1987 to Helsene et al., in U.S. Pat. No. 5,407,384 issued on Apr. 18, 1995 to Boody et al. and in U.S. Pat. No. 5,882,252 issued on Mar. 16, 1999 to Boody et al. Apparatus commonly known as "loin pullers" are also used to separate back fat from loins that have previously been separated from the bellies. Such loin pullers are disclosed in U.S. Pat. No. 4,189,806 issued on Feb. 26, 1980 to Heyningen and in U.S. Pat. No. 4,979,269 issued on Dec. 25, 1990 to Norrie.

Once the back fat has been removed from the loin, the latter can be further processed to produce various secondary cuts, including boneless cuts such as back boneless long and short cuts, boneless sirloin, tenderloin and boneless chops. Typically, a first deboning step consists of removing the main part of the spine from the loin, leaving only back ribs and feather bones on the partially deboned loin, which remaining ribs and bones can be removed in a further step to provide fully deboned meat. Usually, that first loin deboning operation is manually performed by an operator using a powered rotary or band saw for making a longitudinally cut along the half spine on both sides thereof through the back ribs and the feather bones portions, to allow removal the spine from the loin. While such cutting operation can be performed in a single transverse straight cut through both back ribs and feather bones simultaneously, it is preferably done in two angular cuts sequentially performed through the backs ribs and the feather bones, to reduce the amount of lean meat remaining on the removed spine. Such manual cutting techniques suffer from important drawbacks. Manual deboning is hazardous and time-consuming for the butchers, and provides relatively poor control over the amount of lean meat remaining on the removed spine, which must be kept at a minimum, as well as over the back ribs length remaining on the loin, which must be maximized, to optimize economic value and quality of the cuts.

As an alternative to manual deboning, automated deboning apparatus for removing the spine from a loin or half carcass middle have been known for years. Such an apparatus is disclosed in U.S. Pat. No. 3,982,299 issued on Sep. 28, 1976 to Kompan, which apparatus comprises a knife for feeding a loin to a cutting station using a band saw to make a transverse straight cut through the spine at a predetermined distance from the spine ridge. As for the first manual technique discussed above, the use of such a single straight cut apparatus is not advantageous since it generates significant lean meat loss. Another apparatus using the double-cut approach is disclosed in U.S. Pat. No. 4,134,181 issued on Jan. 16, 1979 to Schneider, which apparatus comprises a conveyor having a concave surface adapted to receive a corresponding outer convex surface of a loin for sequentially feeding thereof to a first rotary saw for making a longitudinal cut in a first, horizontal plane along the spine through the feather bones as spine extensions, to a second rotary saw having its blade being angularly oriented with respect to the blade of the first rotary saw to make a second longitudinal cut in a corresponding second plane along the spine, and to a third rotary saw for making a longitudinal cut in a third, vertical plane along the spine for separating the feather bones from the loin eye. Although representing an improvement over the above prior art apparatus, as for the second manual technique discussed above, the use of such a double-cut apparatus is also disadvantageous in that it still produces removed spines showing a significant otherwise valuable lean meat amount leaved thereon, which is therefore lost.

In an attempt to optimize the cut, another cutting approach is used by a deboning apparatus disclosed in U.S. Pat. No. 5,746,648 issued on May 5,1998 to Wilhelmus et al., which apparatus provides spine removal from a half carcass middle transported on a conveyor, using a cylindrical separating element having a circular toothed cutting edge which rotates at high speed for performing a cut about and along the spine in a plane perpendicular to the conveying direction, while the separated spine portion is discharged through the opening which extends throughout the cylindrical separating element. The circular shape of the cutting edge allows a cut showing an arcuate profile that better conforms to the general section of the spine, and therefore minimizes the lean meat left thereon. However, the friction of the cutting edge on the meat piece due to the high rotation speed of the separating element may induce local heating of the meat piece, which may affect its quality. Moreover, high rate repetitive cuts of the teeth through the meat piece may cause undesirable meat slashing that can also affect meat quality. Furthermore, since the separating element is provided with teeth showing a conventional ramp shape, the apparatus as taught by Wilhelmus generates bone dust or chips remaining behind in the meat piece, which may further adversely affect its quality. A solution to the latter problem is disclosed in European Patent Application published on Feb. 3, 1999 to Meerdink under No. 894 438, which consists of providing the cylindrical separating element with a cutting edge showing a series of teeth each of which is embodied with a guide surface directed toward the inner side element, such that bone dust or chips are carried away to the inside and contamination of the meat piece is therefore prevented. However, even if the apparatus of Meerdink may prove to avoid contamination of the meat piece by bone dust or chips as opposed to the apparatus of Wilhelmus, neither of those proposes a solution to the meat heating and slashing problems.

It is therefore an object of the present invention to provide apparatus an method for deboning a piece of meat having an elongate bone portion, which provide control over the meat left on the removed bone, while preserving the quality of the deboned meat piece.

According to the above object, from a broad aspect of the present invention, there is provided an apparatus for deboning a piece of meat having an elongate bone portion, comprising holding means for maintaining the piece of meat in a predetermined cutting position wherein its elongate bone portion is substantially aligned with a longitudinal axis defined by said holding means, and a cutting tool including an elongate shearing knife having a base portion pivotally mounted on a support structure and an inwardly arcuate section defining a longitudinally extending cutting edge. The cutting tool further includes means mounted on the structure for selectively controlling pivotal movement of the knife between a first position allowing the piece of meat to be disposed in the predetermined cutting position and a second position wherein the elongate bone portion is separated from the deboned meat piece following travel of the cutting edge through the meat piece according to a curvilinear cutting path transversely extending about the longitudinal axis.

According to another broad aspect of the invention, there is provided an apparatus for deboning a piece of meat having an elongate bone portion, said apparatus comprising holding means for maintaining the piece of meat in a predetermined cutting position wherein its elongate bone portion is substantially aligned with a longitudinal axis defined by said holding means, and a cutting tool including a pair of elongate shearing knives having respective base portions pivotally mounted on a support structure and having respective inwardly arcuate sections defining longitudinally extending opposed cutting edges. The cutting tool further includes means mounted on the structure for selectively controlling pivotal movement of the knives between a tool open position wherein the knives are in a spaced relationship allowing the piece of meat to be disposed in the predetermined cutting position and a tool closed position wherein the opposed cutting edges of the knives are brought into contact to separate the elongate bone portion from the deboned meat piece following respective travels of the cutting edges through the meat piece according to convergent curvilinear cutting paths transversely extending about the longitudinal axis.

According to a further broad aspect of the invention, there is provided a method of deboning a piece of meat having an elongate bone portion, comprising the steps of: maintaining the piece of meat in a predetermined cutting position wherein its elongate bone portion is substantially aligned with a longitudinal axis; and shearing the piece of meat according to a curvilinear cutting path transversely extending about the longitudinal axis to separate the elongate bone portion from the deboned meat piece.

According to a still further broad aspect of the invention, there is provided a method of deboning a piece of meat having an elongate bone portion, comprising the steps of: maintaining the piece of meat in a predetermined cutting position wherein its elongate bone portion is substantially aligned with a longitudinal axis; and shearing the piece of meat according to two convergent curvilinear cutting paths transversely extending about the longitudinal axis to separate the elongate bone portion from the deboned meat piece.

BRIEF DESCRIPTION OF THE DRAWINGS

Preferred embodiments of the present Invention will now be described with reference to the accompanying drawings in which.

DETAILED DESCRIPTION OF THE PREFERRED EMBODIMENTS

Figure 1:
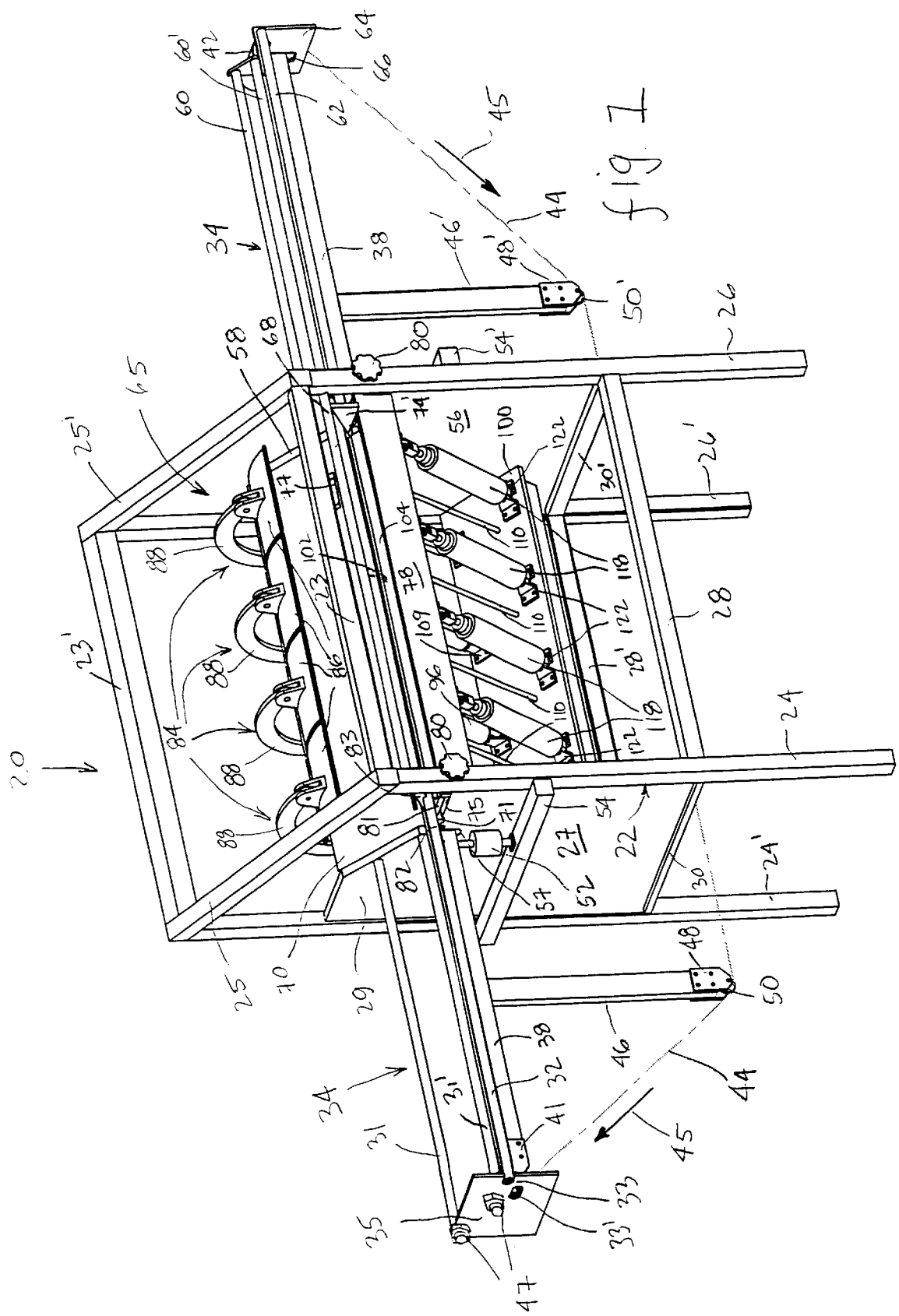
FIG. 1 is a perspective view of a first preferred embodiment of a deboning apparatus according to the present invention.
Figure 2:
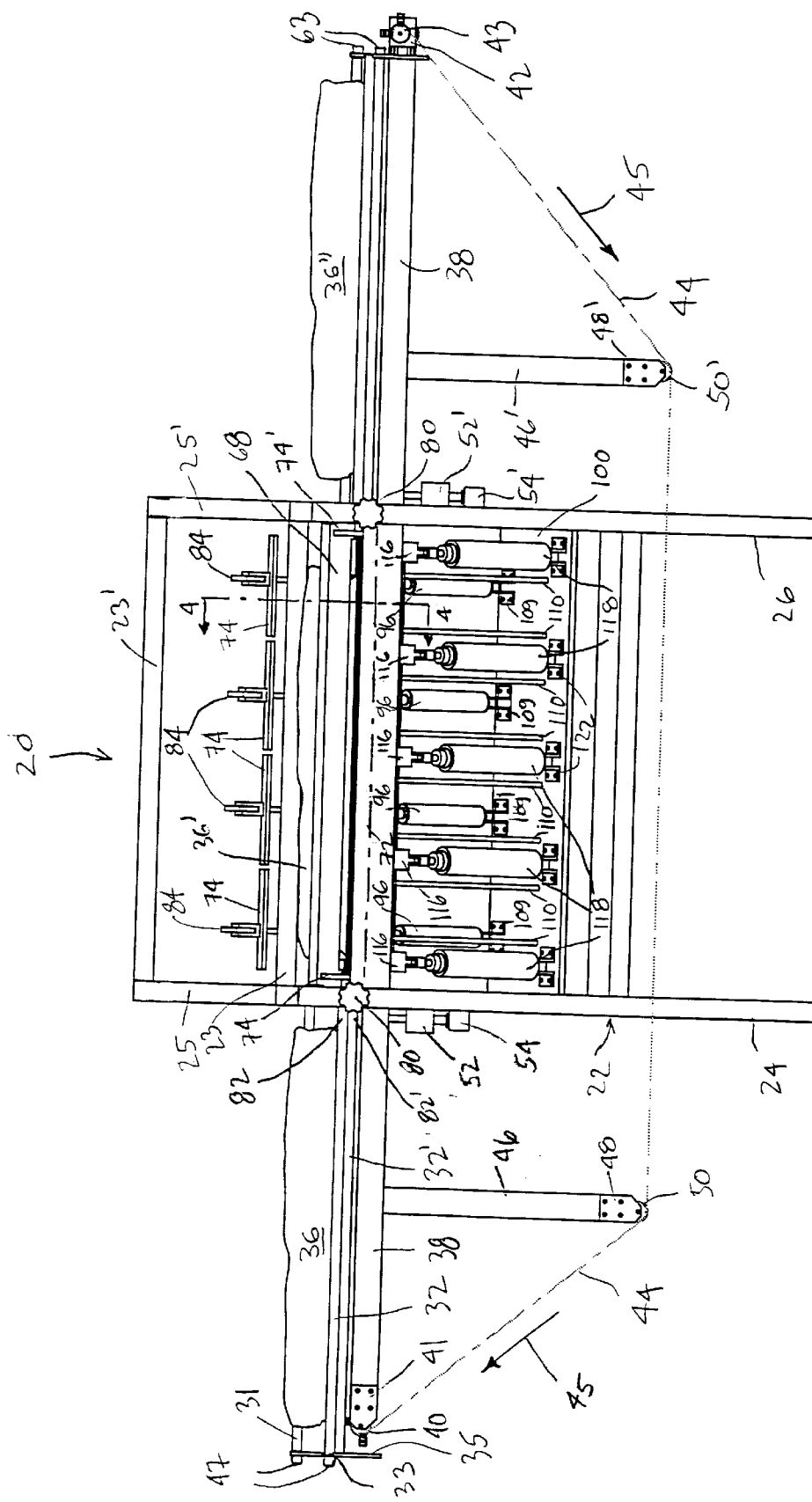
FIG. 2 is a side elevation view of the embodiment of FIG. 1 while in operation, showing an incoming next loin to be processed at the feeding end of the conveyor, a loin under processing disposed over an elongate support as part of the cutting unit, and a deboned loin at the discharging end of the conveyor.
Figure 3:
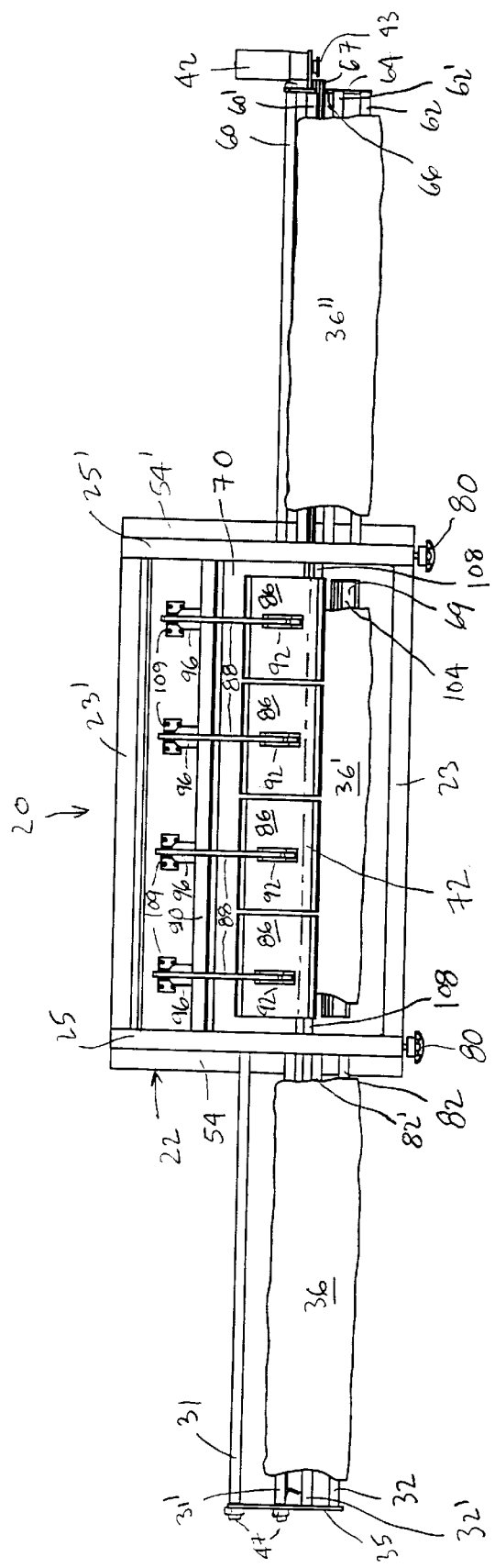
FIG. 3 is a top plan view of the embodiment of FIG. 1 while in operation as shown in FIG. 2.
Figure 4:
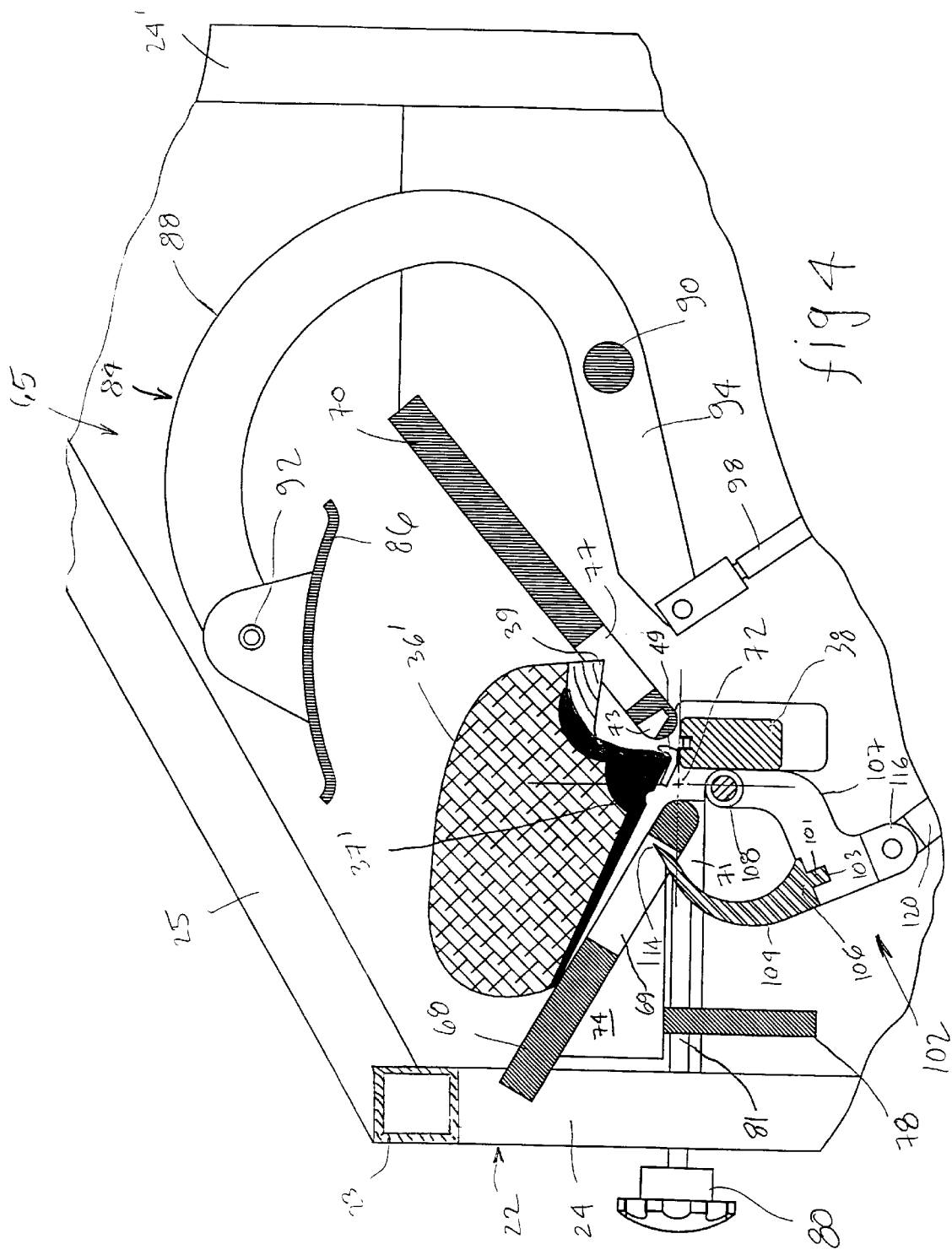
FIG. 4, is a partial cross-sectional view according to section lines 4—4 as indicated in FIG. 2, showing the cutting unit being fed with a loin as held over the elongate support by the conveyor chain brought in an upper position by the lift mechanism provided on the conveyor, and showing one of the press devices raised in an upper position.

Referring to FIGS. 1 to 3, a first preferred embodiment of a deboning -apparatus according to the present invention as applied to pork loin deboning will now be described in detail. However, It should be understood that an apparatus according to the same invention could be designed to debone loins of other animals such as beef or lamb, or to debone other types of meat piece having an elongate bone portion. The deboning apparatus generally designated at 20 comprises support structure in the form of a frame 22 having rear legs 24, 24' and front legs 26, 26' linked by four transverse members 28, 28', 30, 30' and by four top members 23, 23', 25, 25'. Secured to the rear legs 24, 24' and transverse member 30 is a rear plate 27 having an upper portion 29 to which are secured a first pair of parallel spaced guide rods 31, 31'. There is provided a second pair of parallel spaced guide rods 32, 32' that are mounted for transverse displacement as will be later described in more detail. The pair of rods 31, 31' and 32, 32' form the feed end of a conveyor generally designated at 34. The protruding ends of rods 31, 31' are secured to an end plate 35 through bolt and nuts assemblies 47. The protruding ends of rods 32, 32' are received in slots 33 and 33' provided on the plate 35 to support the rods 32, 32' while allowing transverse displacement thereof, as will be explained later in more detail. The pairs of rods 31, 31' and 32, 32' extend within respective planes defining one another an open supporting area adapted to receive an incoming loin 36 as shown in FIGS. 2 and 3. The conveyor 34 further includes a carrying device making use of an endless chain 44 extending along a guide 38 provided with a rear idle sprocket wheel 40 mounted on a rear bracket 41, and being coupled to an electrical driving motor 42 through a driving sprocket wheel 43. Attached on the chain 44 are a plurality of elements 49 as shown in FIG. 4 which are adapted to engage loins 36, 36' and 36" for carrying thereof, as will be explained later in more detail. The carrying device further includes rear and front chain extenders 46, 46' respectively provided with adjustable end brackets 48, 48' onto which are mounted respective idle sprocket wheels 50, 50'. The chain guide 38 is mounted on rear and front linear actuators 52, 52' having respective base portions being rigidly attached to rear and front transverse members 54, 54' respectively secured to the rear frame legs 24, 24' and front frame legs 26, 26'. The actuators 52, 52', which are conveniently of a pneumatic type, are being commanded simultaneously by conventional control means (not shown) to selectively raise or lower the chain guide according to an operating sequence that will be explained later in more detail. Secured to the front legs 26, 26' and transverse member 30' is a front plate 56 having an upper portion 58 to which are secured a third pair of parallel spaced guide rods 60, 60' forming with a fourth pair of parallel spaced guide rods 62, 62' the discharge end of the conveyor 34. The protruding ends of the rods 60, 60' are secured to a second end plate 64 through bolt and nut assemblies 63 as shown in FIG. 2, to which plate 64 is also secured the motor 42. The protruding ends of the rods 62, 62' bear on an upper edge of the end plate 64, allowing the processed loin 36" to be discharged by gravity when reaching the output end of the conveyor 34. Each one of plates 27 and 56 is provided with a slot 57 through which the guide 38 extends. A vertical slot 66 is also provided on the plate 64 through which the front end 67 of the guide 38 extends, as shown in FIG. 3. The pairs of rods 60, 60' and 62, 62' extend within respective planes defining one another an open supporting area adapted to receive the processed loin 36" at the discharge end of the conveyor 34 as shown in FIGS. 2 and 3. It should be understood that any other type of suitable conveying device or feeder could be used to implement the conveyor 34, such as belt conveyors or push feeders and ejectors.

Also mounted on the frame 22 is a cutting unit generally designated at 65 in FIG. 1, which includes holding means for maintaining the piece of meat in a predetermined cutting position, which combine press means in the form of a plurality of press devices 84 and an elongate support formed by first and second support elements in the form of plates 68, 70 for receiving adjacent sides of the loin 66' to be processed with its elongate bone or spine portion 37' being substantially aligned with a longitudinal axis 72 generally defined by the plates 68, 70 of the elongate support, as shown in FIGS. 2 and 3. The fourth pair of parallel spaced guide rods 62, 62' is mounted on a front edge of the support plate 70 for providing transverse displacement therewith. As better shown in FIG. 3, the plate 68 defines a first elongate opening 69 generally extending parallel to the longitudinal axis 72, the purpose of which will be explained later in detail. The plate 68 is mounted on a pair of skids 74, 74' bearing on an upper edge of a lateral plate 78 secured at opposed ends thereof to edges 75 provided on rear and front plate 27, 56. The support plate 68 is preferably designed to be transversely displaceable to allow adjustment of the cut profile, as will be explained later in more detail. The lower corners of the plate 68 are mounted on a transverse and vertical positioning mechanism comprising rear and front sliding blocks 71 bearing on the edges 75 of the rear and front plates 27, 56. To each sliding block 71 is mounted for free rotation the pivoting end of a rod 81 having a threaded portion extending through a corresponding threaded bore provided on opposed ends of the frame plate 78, and being ended by a rotary handle 80. The ends 82, 82' of the rods 32, 32' are rigidly secured to a rear edge 83 of the plate 68, so that the rods 32, 32' are made displaceable with the support plate 68 to maintain alignment therewith. Any other type of suitable positioning mechanism, such as a vertically displaceable base (not shown) for both support plates 68, 70 could be incorporated instead of the mechanism described above, to provide the required adjustment of the cut profile. The press devices 84 are mounted on the frame and disposed along the longitudinal axis 72 for maintaining the loin 66' in a predetermined cutting position on the support plates 68, 70. It has been found preferable to provide a plurality of such press devices 84 to provide a better compliance with the varying profile of the loin surface. However, it is to be understood that equivalent press means such as chain biasing conveyor or shaped load member can be used, provided it can maintain the loin along its length on the support area while cutting. Each press device 84 has a displaceable contacting element 86 adapted to press a corresponding area of an exposed surface of the loin 36' to cause a corresponding generally opposed surface area of the loin 36' to be pressed against the support plates 68, 70. Each press device 84 further has a pivoting member 88 having a base portion pivotally mounted on the rear and front plates 27, 56 through a traversing axle 90 as shown in FIG. 3, and a free end being pivotally attached to the contacting element 86 through a pivot attachment 92. The base portion of each pivoting member 88 is provided with an extension 94 the extremity of which is coupled to a bothway actuator device including a cylinder 96 preferably of a pneumatic type, the piston 98 of which is pivotally coupled to the extension 94, and having a body pivotally connected through brackets 109 to a lower support base 100 secured at rear and front edges thereof to rear and front plates 27, 56. Conventional pneumatic supply and control means (not shown) are also provided for commanding operation of the cylinders 96 to control the pivotal movement of the members 88 about their respective base portions, as will be explained later in more detail. For applications involving a meat piece provided with an elongate bone showing a naturally occurring curved shape which cannot be aligned with the longitudinal axis 72 of the support while being maintained thereon, a lateral press device or guide (not shown) may be incorporated. As better shown in FIG. 4, the cutting unit further includes a cutting tool generally designated at 102 which includes an elongate shearing knife 104 having a base portion 106 pivotally mounted on the frame through a plurality of longitudinally spaced pivoting members 107 connected for rotation to an axle 108 rigidly secured at both ends thereof to the rear and front plates 27, 56 and supported along its length by ring ended tie rods 110 bolted on the support base 100, as shown in FIGS. 1 and 2. The knife 104 is conveniently provided with a longitudinal tongue 101 designed to fit within grooves 103 provided on the pivoting members 107 and to be secured thereon with set screws (not shown), allowing easy knife replacement. The knife 104 further has an inwardly arcuate section defining a longitudinally extending cutting edge 114, the shape of which section being designed to allow a travel of the cutting edge through the meat piece according to a curvilinear cutting path transversely extending about the longitudinal axis 72 defined by the support plates 68, 70, from the opening 69 to a second recessed opening 73 longitudinally extending on the second plate 70, as shown in FIG. 4. The plate 70 is conveniently provided at its front portion with a further opening 77 to allow protruding back ribs 39 of the loin 36' to be received therein, to prevent any misalignment of the loin as it is laid down in a cutting position. While the narrow opening 77 as shown may generally be suitable, an elongate opening similar than the opening 69 may also be provided to prevent any obstruction while conveying the loin 36'. It is to be understood that such further opening may be not required depending on the type of meat piece to debone. While the cutting edge 114 may extend parallel to the longitudinal axis 72 and though not illustrated in FIG. 4, the cutting edge 114 preferably exhibits a small angle with respect to axis 72 to provide a guillotine effect which eases knife penetration within the bone material of the loin. It can be appreciated by any person skilled in the art that the positioning mechanism as described above could also be replaced by a vertically displaceable cutting tool holder, to provide the required adjustment of the cut profile. Furthermore, the chosen positioning mechanism can be in turn coupled to an actuating device for controlling its operation. For example, preset positions corresponding to predetermined sizes of meat pieces may be stored in a control device coupled to an operator interface allowing the operator to select a desired position according the average size of the bone portions of meat pieces included in a batch to be processed. Alternatively, a sensor-based device such as a camera with image processing hardware and software, capable of measuring dimensions of the bone portion for each meat piece to be processed may also be coupled to an automatic positioning control system for the cutting unit.

Figure 5:
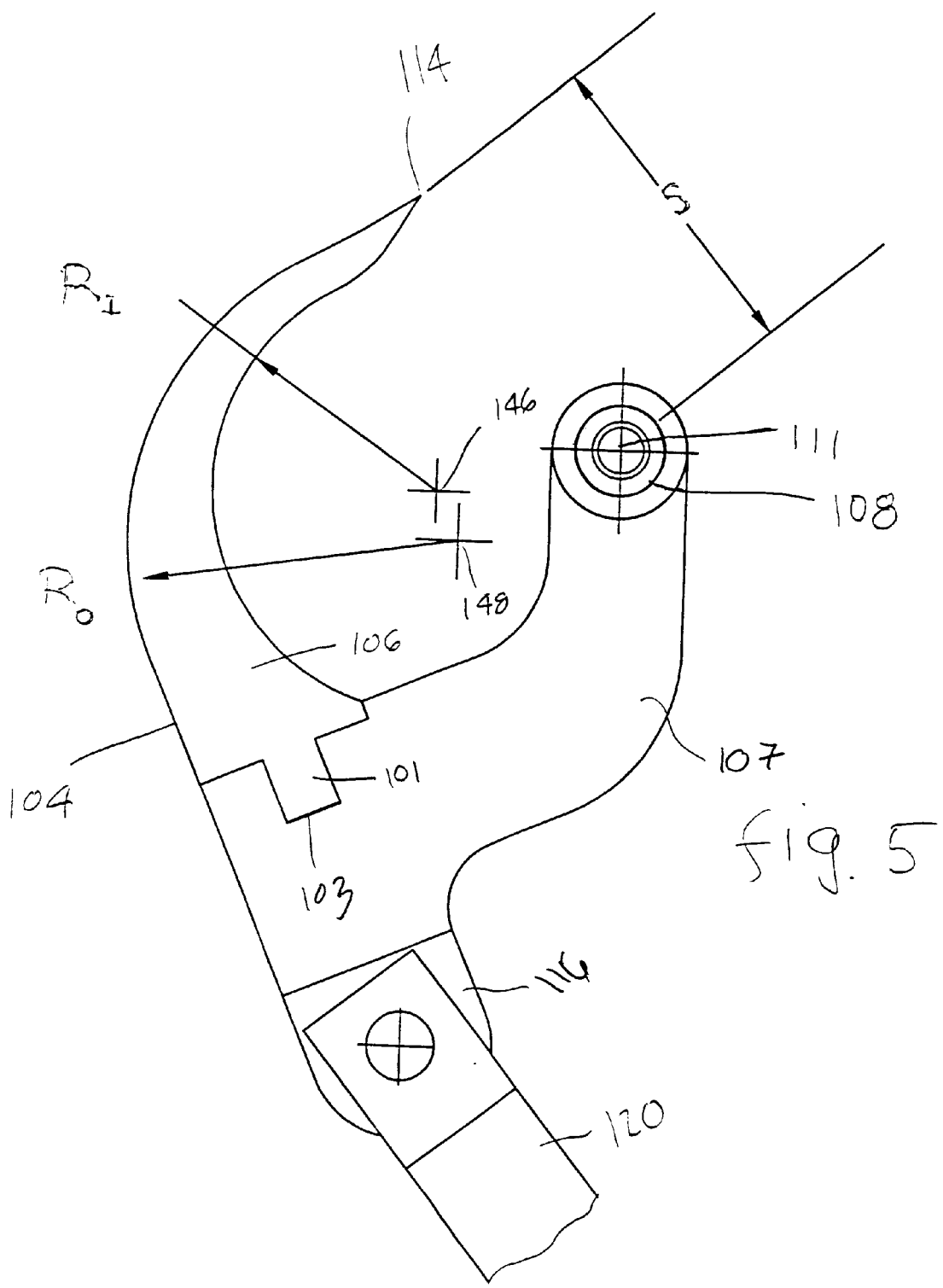
FIG. 5 is a detailed front-end view of the knife shown in the embodiment of FIG. 1, illustrating an example of design parameters for the knife.

Turning now to FIG. 5, it can be seen that the cutting edge 114 of shearing knife 104 and the axis 111 of axle 108 are separated by a spacing S the value of which is determined from an average thickness value of the bone portion of the meat pieces to debone. Other parameters are the inner radius $R_I$ as measured with reference to an axis 146 located between the knife base portion 106 and axle 108 in the example shown, and the outer radius $R_O$ as measured with reference to an axis 148 located near the axis 146 in the same example. The choice of specific values for radius $R_I$ and $R_O$ depends from the size of the meat pieces to be deboned and from the desired cut profile. It can be seen that the cutting edge 114 is substantially aligned tangentially to the outer surface of the knife 104 to prevent cutting edge jamming within the bone while cutting along the curvilinear cutting path. As an example, for a typical loin deboning application, the spacing S, and radius $R_I$, $R_O$ may be assigned values of about 1.75, 1.25 and 1.75 inch, respectively, wherein S=$R_O$. For larger loins, a same ratio could conveniently be used.

Returning to FIG. 4, each pivoting member 107 has a base extension 116 being distant from the axle 108 and being coupled to a both-way actuating device including a cylinder 118 preferably of a hydraulic type, the piston 120 of which being pivotally coupled to the extension 116, and having a body pivotally connected through brackets 122 to the lower support base 100. A single more powerful hydraulic cylinder may also be provided in combination with an appropriate simple mounting assembly (not shown). Conventional hydraulic supply and control means (not shown) are also provided for commanding operation of the cylinders 118 to control the pivotal movement of the knife 104 about the longitudinal axis 72, as will be explained later in more detail. Alternatively, any other type of suitable both-way actuating device and control may be employed, such as an rotary actuator coupled to a clutch to an hydraulic or electrical motor.

Figure 6:
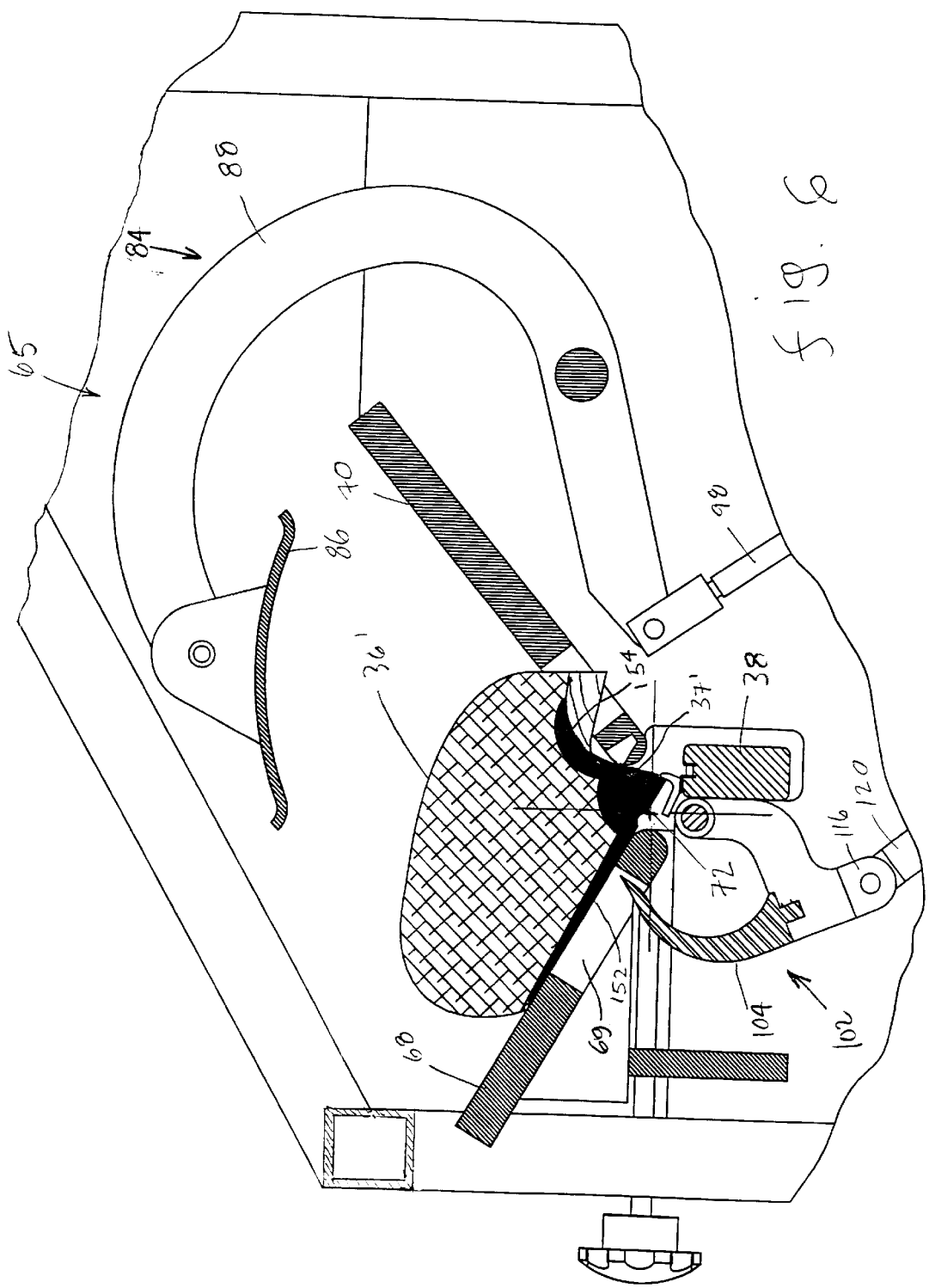
FIG. 6 is a partial cross-sectional view of the cutting unit receiving the loin as laid down onto the elongate support by the conveyor chain brought in a lower position by the lift mechanism.
Figure 7:
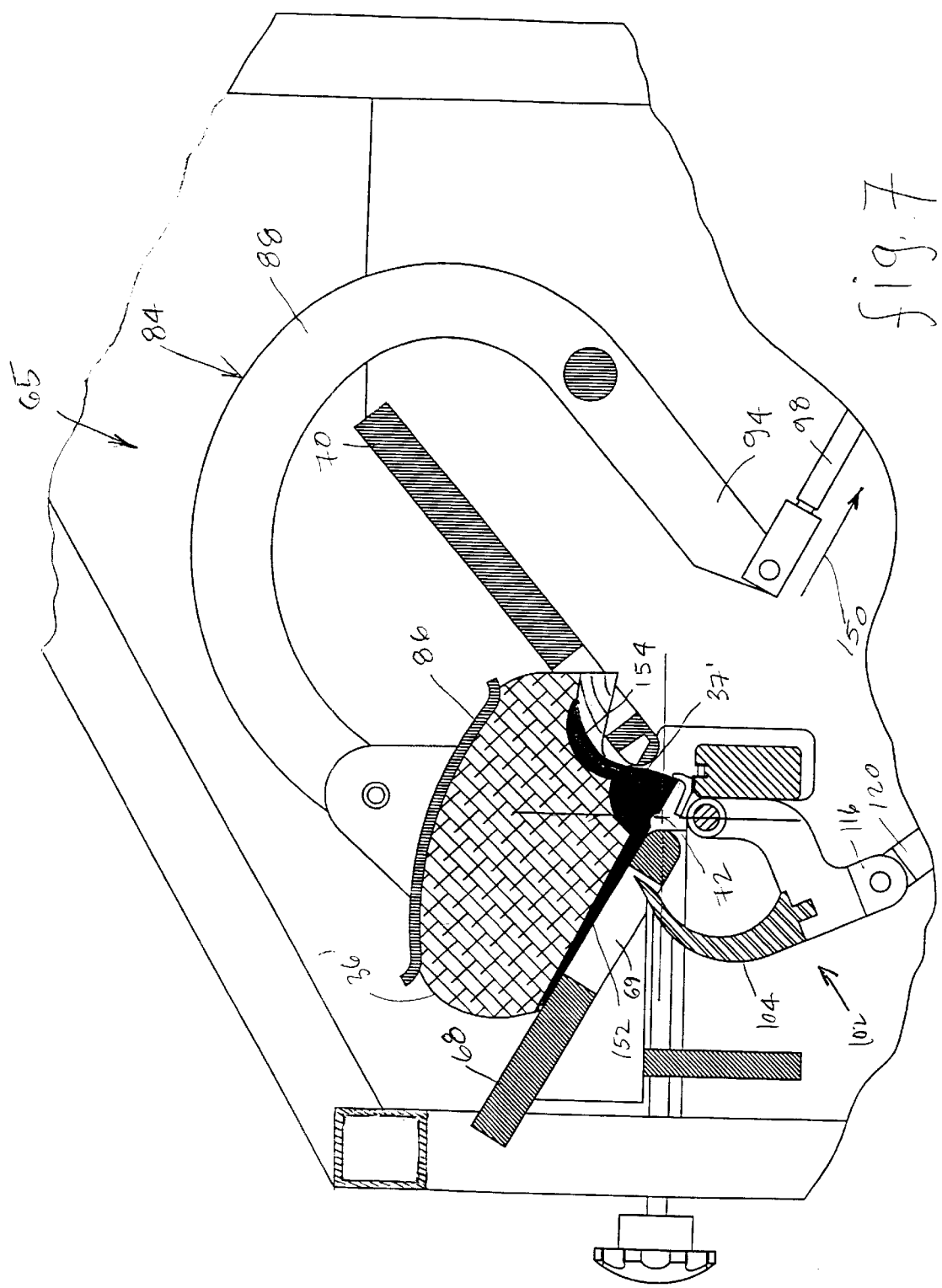
FIG. 7 is a partial cross-sectional view of the cutting unit showing one of the press devices brought in a lower position for maintaining the meat piece in a predetermined cutting position on the elongate support, with the cutting tool provided on the cutting unit being in an open position.
Figure 8:
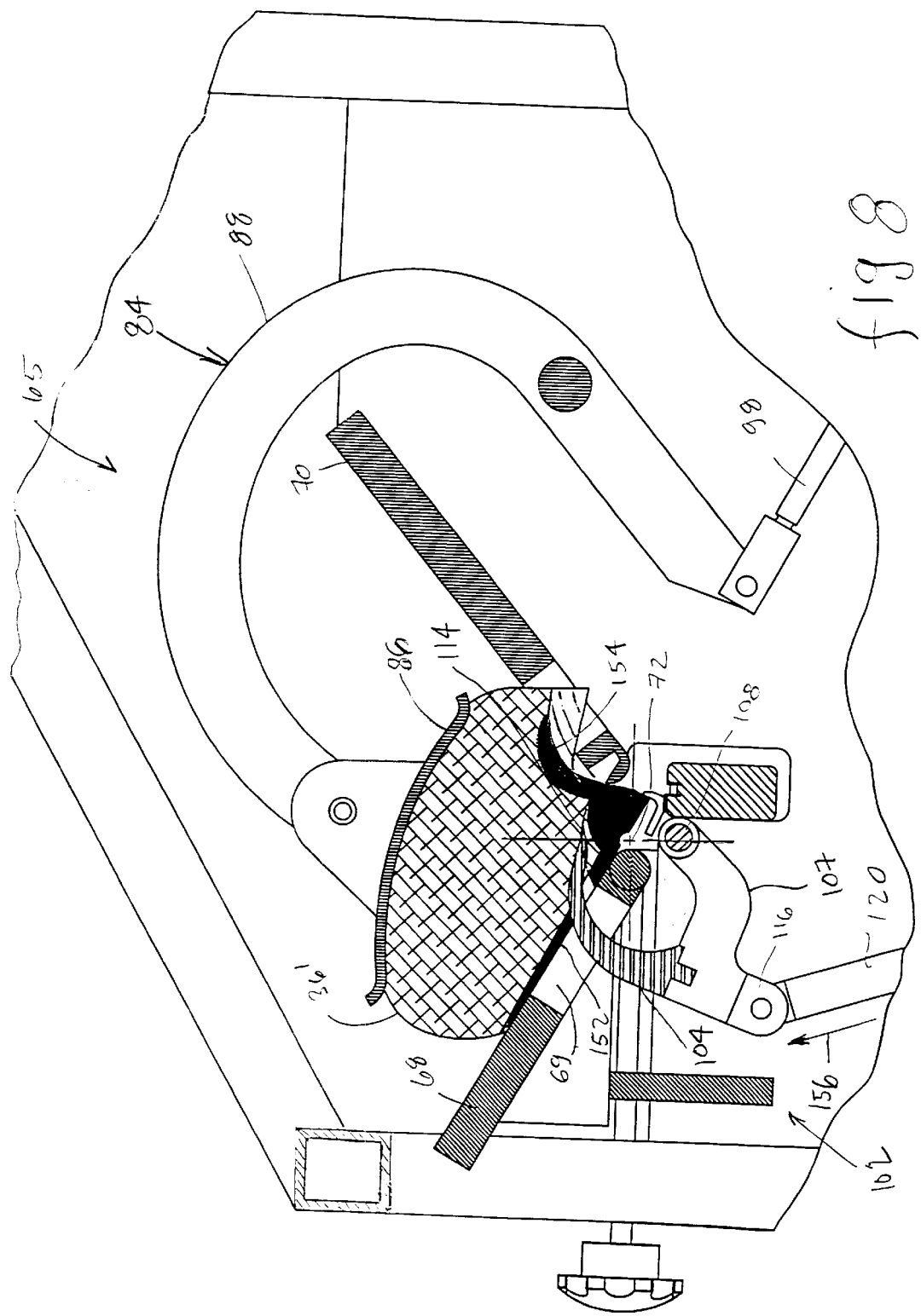
FIG. 8 is a partial cross-sectional view of the cutting unit showing the shearing knife of the cutting tool while its cutting edge is traveling through the meat piece according to a curvilinear cutting path.
Figure 9:
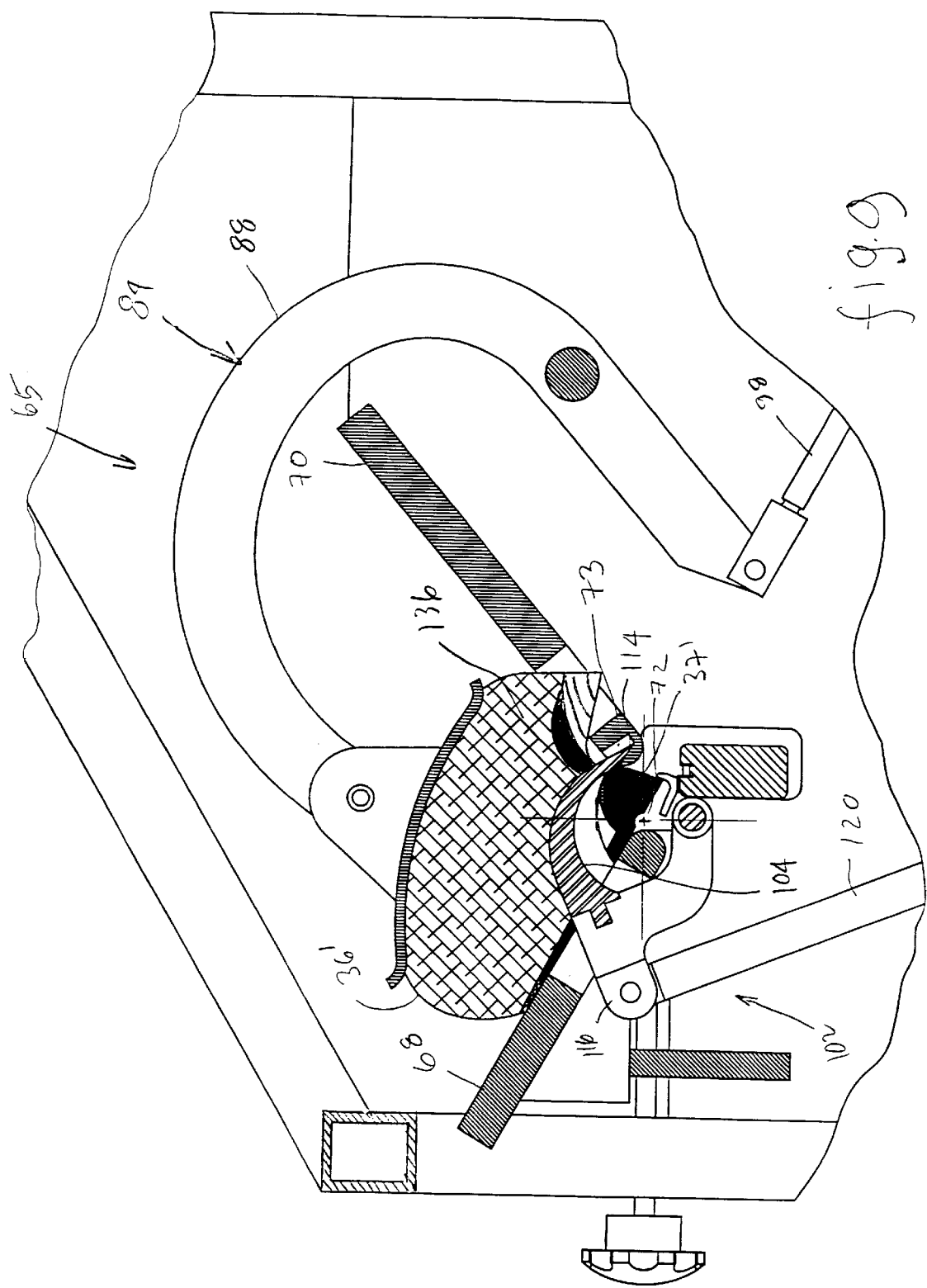
FIG. 9 is a partial cross-sectional view of the cutting unit showing the shearing knife of the cutting tool in a closed position wherein the elongate bone portion of the meat piece is separated from the deboned meat piece.
Figure 10:
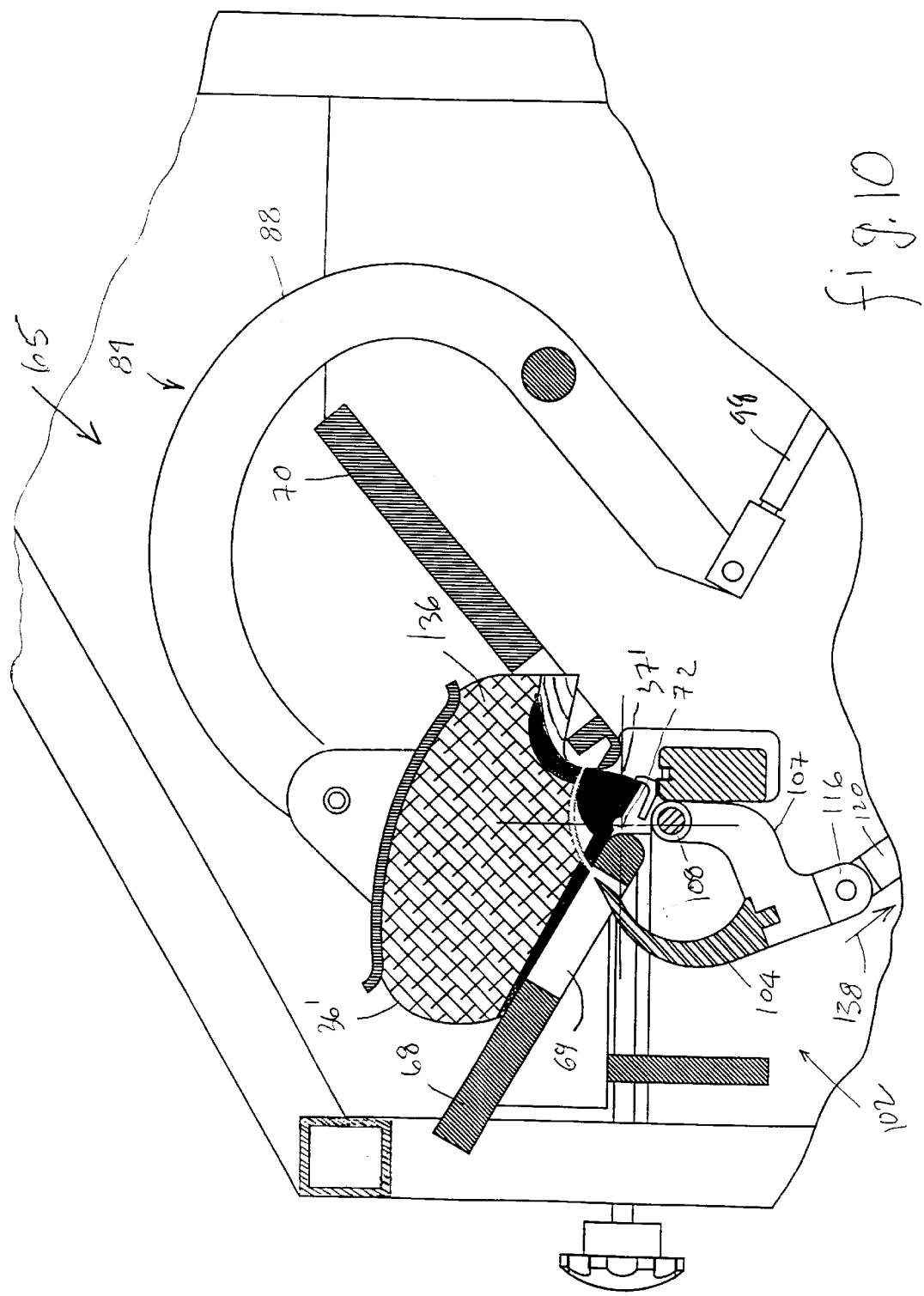
FIG. 10 is a partial cross-sectional view of the cutting unit showing the shearing knife brought back in the open position following the separation.
Figure 11:
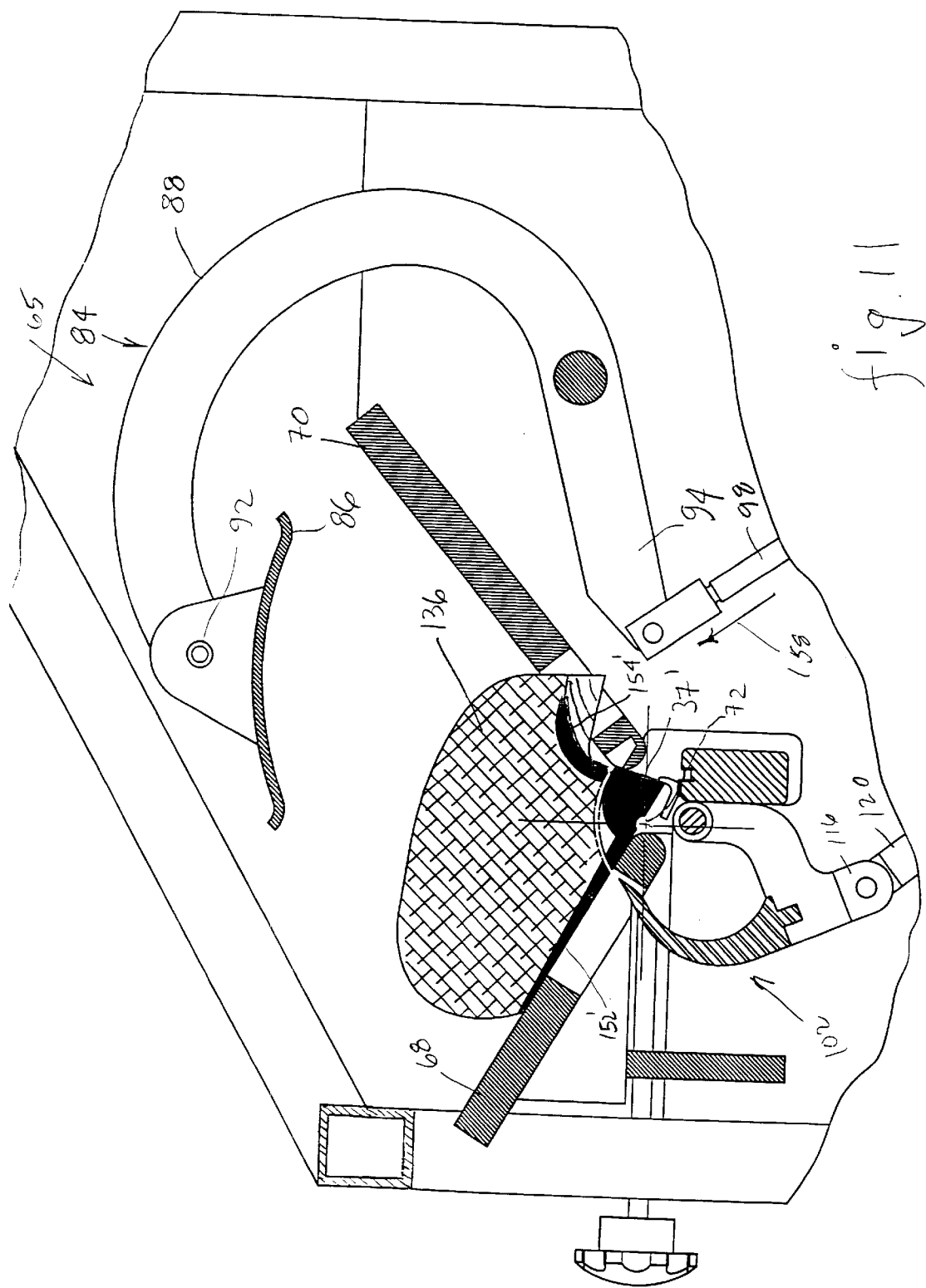
FIG. 11 is a partial cross-sectional view of the cutting unit showing the press device brought back in an upper position following withdrawal of the shearing knife, to allow the discharge of the separated bone portion and deboned meat piece.

Operation of the first preferred embodiment of a deboning apparatus according to the present invention will now be explained in detail with reference to FIGS. 2 and 3, further in view of FIGS. 4 and 6–9. First, the cutting position corresponding to a desired loin cut profile is adjusted by turning the rotary handles 80 so as to horizontally displace the first support plate 68 so as to vertically shift the cutting position of the loin due to the inclined plane defined by the plate 68. Since the section area of the bone at front and rear ends thereof may be different, each corresponding end of the support plate 69 may be independently adjusted accordingly. As to supply pressures parameters, experiences using the apparatus as described above have shown that an air supply pressure level of at least about 60 psi applied to the cylinders 96 was necessary to provide a pressing force onto the loin of about 130 pounds, which has been proved sufficient to maintain the loin in a desired cutting position. Those experiences have also shown that a fluid supply pressure level of at least 140 psi to the hydraulic cylinders 118 was necessary to provide a cutting force of at least 2170 pounds, which has been proved sufficient to separate a typical loin through its bone material. Its is to be understood that since the pressure parameter values as given above are specific to the preferred embodiment described as applied to a pork loin deboning application, these values must be considered as being only indicative. Once the operating parameter values of the apparatus have been adjusted, a next meat piece to be deboned, which is a pork loin in the instant example, is laid down on the guide rods 31, 31', and 32, 32' at the feed end of the conveyor 34, either manually or through an upstream accumulating conveyor (not shown) of a known design. Then, the linear actuators 52, 52' are caused through operation of the control means to raise the chain guide 38 in its upper position, thereby lifting the loin 36 sufficiently to allow sliding thereof along the guide rods 31 upon driving of the chain 44 in a clockwise direction as indicated by arrows 45 in FIGS. 1 and 2, for conveying the loin designated now at 36' over the support plates 68, 70 of the cutting unit, as shown in FIG. 4. Then, the linear actuators 52, 52' shown in FIG. 2 are caused by the operation of the associated control means to let down the chain guide 38 in its lower position as shown in FIG. 6, so as to set down the loin 36' on the support plates 68,70, in a position where the spine portion 37' is substantially aligned with the longitudinal axis 72. At a next step the cylinders 96 shown in FIG. 2 are caused by the operation of the associated control means to pull the extension 94 of the pivoting member 88 in the direction of arrow 150 for displacing the press device 84 from an open position shown in FIG. 6 to a working position as shown in FIG. 7, wherein each contacting element 86 applies a pressure on a corresponding area of the exposed surface of the loin 36' to cause a corresponding generally opposed surface area of the loin formed by the feather bones 152 and the base of the spine portion 37' to which are attached the back ribs 154 to be pressed against the support plates 68, 70 for maintaining the loin thereon in a predetermined cutting position. It can be seen that the pivoting members 107 and the attached knife 104 are maintained in a first recessed position allowing the loin 36' to be disposed in the cutting position on the support plates 68, 70. Then, the hydraulic cylinders 118 shown in FIG. 2 are caused by the operation of the associated control means to push the base extension 116 of the pivoting member 107 in the direction of arrow 156 as shown in FIG. 8, for imparting clockwise pivotal movement to the member 107 and the attached knife 104 about the axle 108 through the opening 69 of the plate 68, thereby causing penetration of the cutting edge 114 through the feather bones 152 and then transversely forward along the spine portion 37' according to a curvilinear cutting path transversely extending about the longitudinal axis 72. It should be understood that the position of the plate 68 could have been set differently to vary the position of the cutting path accordingly. The movement of the pivoting member 107 continues until the cutting edge 114 of the knife 104 reaches a second position as shown in FIG. 9, wherein the spine portion 37' is separated from the deboned loin portion 136 following travel of the cutting edge 114 through the loin 36' according to the curvilinear cutting path, wherein the support plates 68, 70' delimit the travel of the cutting edge 114. It can be seen that following cutting of the back ribs 154, the cutting edge 114 is received within the second recessed opening 73 provided on the plate 70, to complete separation. At a next step shown in FIG. 10, the knife is caused to be withdrawn trough activation of the hydraulic cylinders 118 shown in FIG. 2, which are commanded by their associated control means to pull the base extension 116 of the pivoting member 107 in the direction of arrow 138, for imparting counter-clockwise pivotal movement to the member 107 and the attached knife 104 about the axle 108 back through the opening 69 of the plate 68 in a recessed position therein. Then, the cylinders 96 shown in FIG. 2 are commanded by their associated control means to push the extension 94 of the pivoting member 88 in the direction of arrow 158 for displacing each press device 84 from its working position back to its open position as shown in FIG. 11. Finally, the linear actuators 52, 52' shown in FIG. 2 are commanded by their associated control means to raise the chain guide 38 in its upper position, thereby lifting the separated loin and spine portions sufficiently to allow sliding thereof along the plates 68, 70 upon driving of the chain 44 in a clockwise direction as indicated by arrows 45 in FIGS. 1 and 2, for conveying the separated portions to the guide rods 60, 60', 62, 62', where they can be discharged at the output end of the conveyor 34, directly toward a single transfer knife (not shown) or through a loin and bone portions separating mechanical device (not shown). As a result of the use of the present invention, a better control over the amount of lean meat remaining on the removed spine can be provided as compared to the manual technique, which amount may be kept at a minimum, and a better control over the back ribs length remaining on the loin can be obtained, which length can be maximized, to optimize economic value and quality of the cuts. The severed back ribs and featherbones remaining on the deboned loin 136 as shown in FIG. 11 may be removed in a separate processing station, to provide fully deboned meat.

Figure 12:
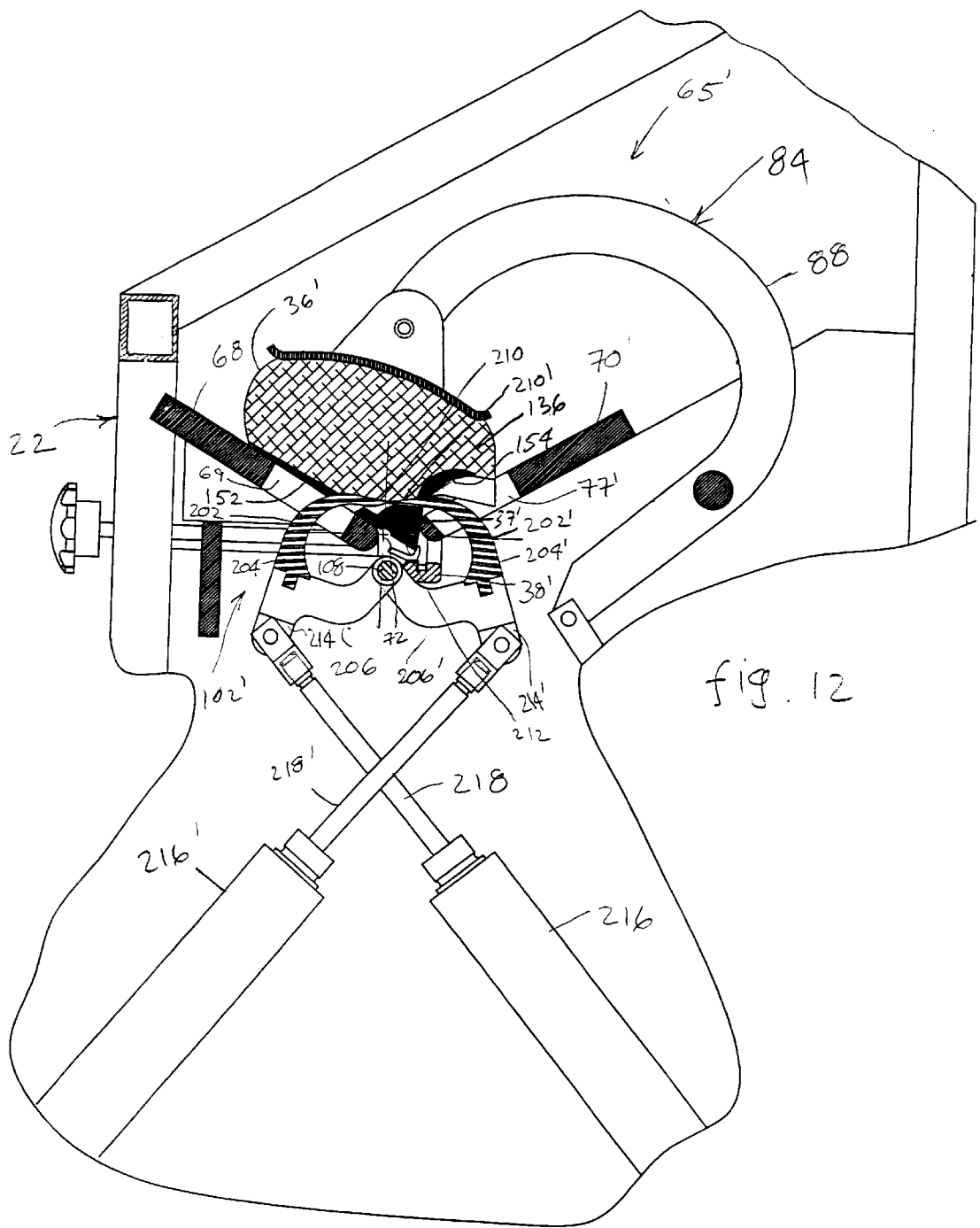
FIG. 12 is a partial cross-sectional view of a the cutting unit provided on a second embodiment of a deboning apparatus according to the present invention, showing a double-knife cutting tool shown in a closed position wherein the elongate bone portion of the meat piece is separated from the deboned meat piece.
Figure 13:
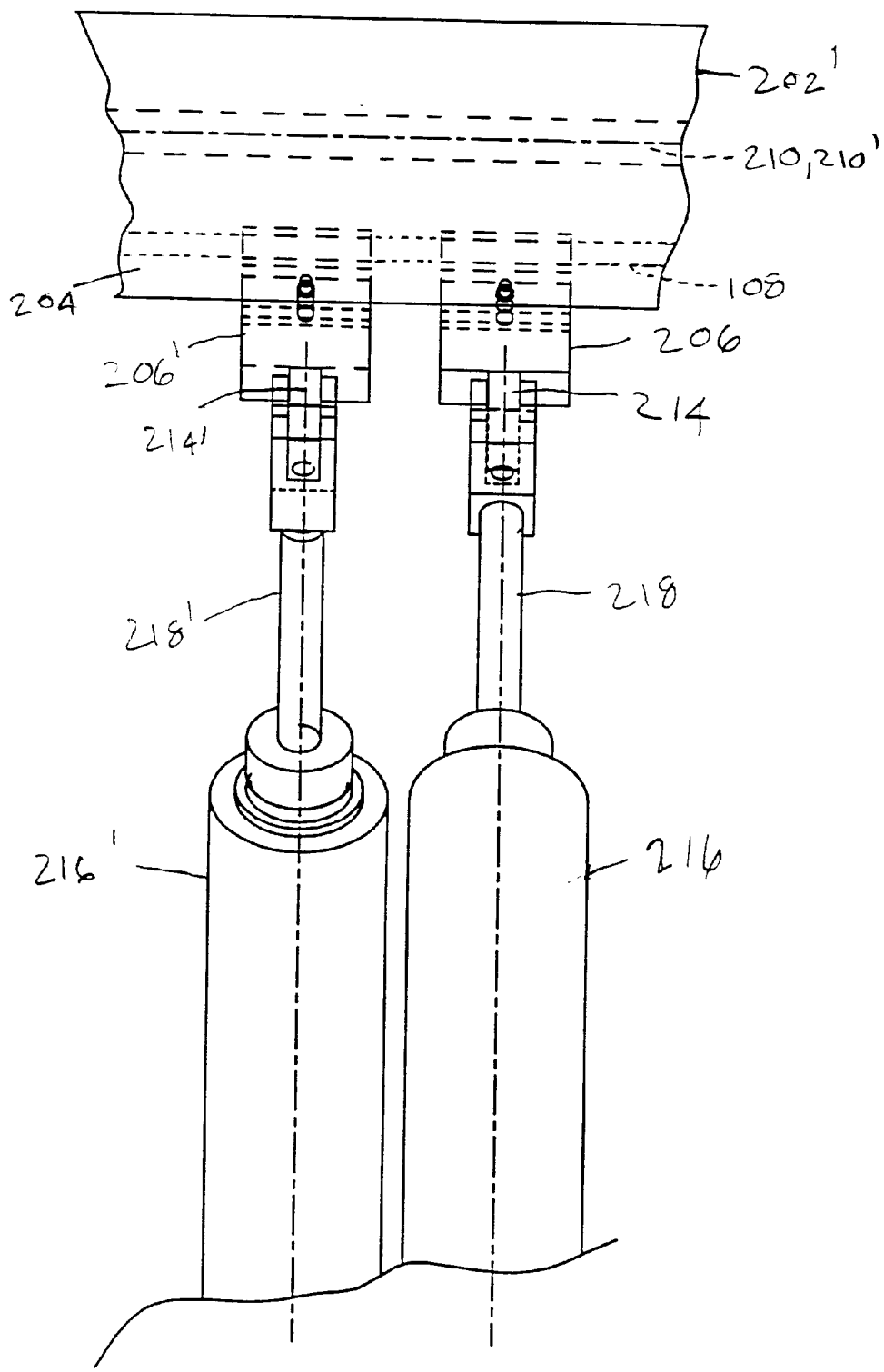
FIG. 13 is a detailed partial side elevation view of the cutting tool according to the second embodiment, showing first and second actuator cylinders respectively provided on first and second opposed series of actuator cylinders for controlling the movement of the double-knife.

Referring now to FIG. 12, an alternate cutting unit 65' provided on a second embodiment of a deboning apparatus according to the present invention, will now be described. Apart from the cutting unit 65' and the associated both-way actuating device, this second embodiment is built and operates essentially in a same way as the first embodiment described before, and therefore the common elements on the second embodiment will be designated with the same corresponding numerals. This embodiment also comprises an elongate support formed by first and second support plates 68, 70' for receiving adjacent sides of a loin 36' to be processed, with its elongate bone or spine portion 37' being substantially aligned with the longitudinal axis 72. It can be seen that the second plate 70' is provided with a single elongate opening 77' generally extending parallel to the longitudinal axis 72, rather than the openings 73 and 77 provided on the plate 77 of the first preferred embodiment. The cutting unit 65' makes use of a double-knife cutting tool generally designated at 102', which includes a pair of elongate shearing knives 202 and 202' having respective base portions 204, 204' pivotally mounted on the frame 22 through two series of longitudinally spaced pivoting members 206, 206' connected for rotation on the common axle 108 rigidly secured at both ends thereof and along its length in a same manner as described before with respect to the first embodiment. It can be seen that the chain guide 38' shows a thin profile design allowing the incorporation of the pivoting member 206'. The knives 202, 202' further have inwardly arcuate sections defining longitudinally extending opposed cutting edges 210, 210' which are shown in a mating relationship in FIG. 12, corresponding to a close position of the cutting tool 102'. The shape of the arcuate sections are designed to allow respective travels of the cutting edges through the meat piece according to convergent curvilinear cutting paths transversely extending about the longitudinal axis 72, from the openings 69, 77' to a mating point 212. Alternatively, the knives 202, 202' may be axially mounted with a small offset one another, or may exhibit complementary cutting edges so that the convergent curvilinear paths may extend from the openings 69, 77' to a mating area where the cutting edges mutually overlap. Each pivoting member 206 has a base extension 214 being distant from the axle 108 and being coupled to a first both-way actuating device including a cylinder 216 preferably of a hydraulic type, the piston 218 of which being pivotally coupled to the extension 214, and having a body pivotally connected through brackets (not shown) to the lower support base in a same manner as described in respect of the first embodiment. As better shown in FIG. 13, being mounted near an adjacent one of pivoting members 206, each member 206' has a base extension 214' being being distant from the axle 108 and being coupled to second both-way actuating device including a cylinder 216' preferably of a hydraulic type, the piston 218' of which being pivotally coupled across the corresponding piston 218 to the extension 214', and having a body pivotally connected through brackets (not shown) to the lower support base in a same manner as described in respect of the first embodiment. Conventional hydraulic supply and control means (not shown) are also provided for commanding operation of the cylinders 216, 216' to control the simultaneous pivotal movement of the knives 204, 204' about the longitudinal axis 72, as will now be explained in more detail. Alternatively, a single both-way actuating device showing a different design (not shown) may be used for simultaneously controlling the movement of both knives 202, 202', by using any suitable coupling mechanisms such as a cam or lever.

Figure 14:
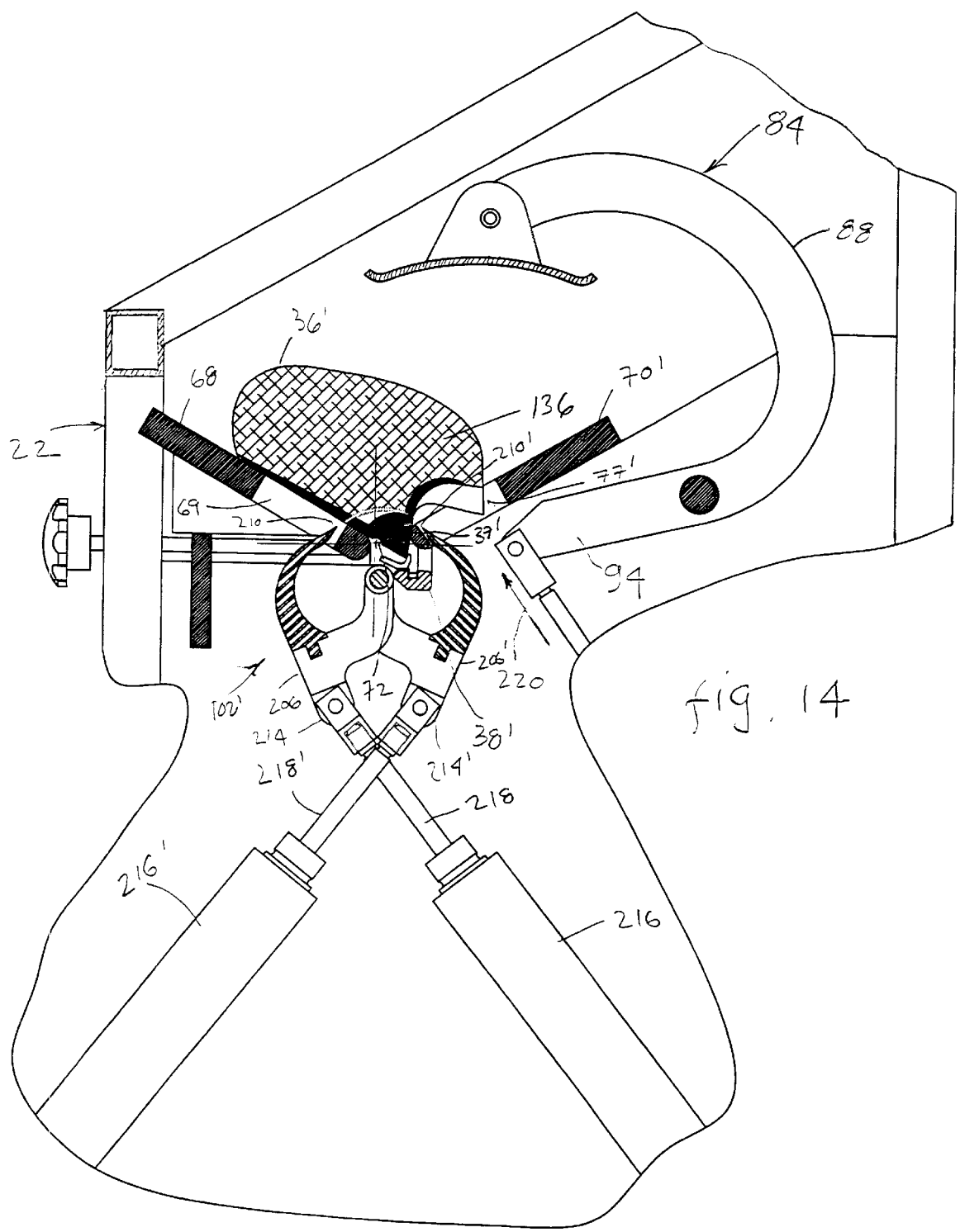
FIG. 14 is a partial cross-sectional view of the cutting unit provided on the second embodiment, showing the double-knife cutting tool brought back in the open position with the press device brought back in the upper position, to allow the discharge of the separated bone portion and deboned meat piece.

In operation, the same supply pressures values as mentioned before may be employed for each both-way actuating device. Before activation of the actuating devices, the pivoting members 206, 206' are maintained in a tool open position wherein the knives 202, 202' are in a spaced relationship within openings 69 and 77' respectively, allowing the loin 36' to be fed to the predetermined cutting position on the plates 68, 70' and be maintained in this position by the press devices 84 as shown in FIG. 12 in a same manner as explained before in respect of the first embodiment. Then, the hydraulic cylinders 216, 216' are caused by the operation of the associated control means to simultaneously push the base extensions 214, 214' of the pivoting member 206, 206' for respectively imparting clockwise and counterclockwise pivotal movements to the member 206, 206' and the attached knives 202, 202' about the axle 108 through the openings 69 and 77'. Following penetration through feather bones 152 and back ribs 154 respectively, the cutting edges 210, 210' continue their respective travels transversely forward along the spine portion 37' according to convergent curvilinear cutting paths transversely extending about the longitudinal axis 72. The movement of the pivoting members continues until the opposed cutting edges 210, 210' are brought into contact at the mating point 212 as shown in FIG. 12, according to a tool closed position wherein the spine portion 37' is separated from the deboned loin portion 136. At a next step, the knives 202, 202' are caused to be withdrawn trough activation of the hydraulic cylinders 216, 216' which are commanded by their associated control means to pull the base extension 214, 214' of the pivoting members 206, 206' for imparting counterclockwise pivotal movement to the member 206, 206' and the attached knives 202, 202' about the axle 108 back through the openings 69, 77' of the plates 68, 70' in recessed positions therein. Then, the cylinders 96 shown in FIG. 2 are commanded by their associated control means to push the extension 94 of the pivoting member 88 in the direction of arrow 220 for displacing each press device 84 from its working position back to its open position as shown in FIG. 14. Finally, the linear actuators 52, 52' shown in FIG. 2 are commanded by their associated control means to raise the chain guide 38' in its upper position, thereby lifting the separated loin and spine portions sufficiently to allow sliding thereof along the plates 68, 70' upon driving of the chain, for discharging in a same way as explained before in respect of the first embodiment.

It is pointed out that both embodiments described above in the context of loin processing can be adapted to debone other meat pieces, such as middle half carcasses, using appropriate holding means. Moreover, the cutting tools as proposed in the embodiments described above may also used in combination with other types of support structures and holding means disposed in any working orientation, such as a meat piece overhang gripper or a robotic arm provided with an end effector integrating the cutting tool for processing pieces of meat as part of half carcasses being vertically hanged on suitable holders.

We claim:

1. An apparatus for deboning a piece of meat having an elongate bone portion, said apparatus comprising:

holding means for maintaining the piece of meat in a predetermined cutting position wherein its elongate bone portion is substantially aligned with a longitudinal axis defined by said holding means; and a cutting tool including an elongate shearing knife having a base portion pivotally mounted on a support structure and an inwardly arcuate section defining a cutting edge longitudinally extending over a length that is at least equal to the length of said elongated bone portion, said cutting tool further including means mounted on said structure for selectively controlling pivotal movement of the knife between a first position allowing the piece of meat to be disposed in the predetermined cutting position and a second position wherein the elongate bone portion is separated from the deboned meat piece in a single tool movement following travel of the cutting edge through the meat piece according to a curvilinear cutting path transversely extending about said longitudinal axis.

2. The apparatus according to claim 1, wherein said apparatus further includes means for adjusting said predetermined cutting position relative to the pivot of said knife to provide adjustment of the curvilinear cutting path traveled by said cutting edge.

3. The apparatus according to claim 1, wherein said holding means comprise:

elongate support means mounted on said support structure for receiving the piece of meat in said predetermined cutting position, said elongate support means defining said longitudinal axis;

press means mounted on the support structure for maintaining the piece of meat in said predetermined cutting position on the elongate support means.

4. The apparatus according to claim 3, wherein said elongate support means include first and second support elements providing first and second supporting surfaces for first and second adjacent sides of said piece of meat and delimiting the travel of said cutting edge, said first support element defining a first elongate opening generally extending parallel to said longitudinal axis and being traversed by said curvilinear cutting path to allow the travel of said cutting edge.

5. The apparatus according to claim 4, wherein said second support element defines a second elongate opening generally extending parallel to said longitudinal axis for receiving said cutting edge when said knife is moved to said second position.

6. The apparatus according to claim 3, wherein said press means include a plurality of press devices disposed along said longitudinal axis, each having a displaceable contacting element for pressing on a corresponding area of an exposed surface of said piece of meat to cause a corresponding generally opposed surface area of the piece of meat to be pressed against said support means.

7. The apparatus according to claim 6, wherein each said press devices further has a pivoting member having a base portion pivotally mounted on said support structure and a free end being pivotally attached to said contacting element, and means for controlling pivotal movement of the member about its base portion between an open position allowing the piece of meat to be disposed in said predetermined cutting position on said support means and a closed position wherein the piece of meat is maintained in the predetermined cutting position.

8. The apparatus according to claim 1, wherein said apparatus further comprises transport means for feeding the piece of meat at an input of the apparatus and for discharging at an output thereof separated bone portion and deboned piece of meat.

9. The apparatus according to claim 8, wherein said transport means include an endless conveyor mounted on a vertically displaceable elongate guide and having drive means being coupled to a plurality of elements adapted to engage the piece of meat, said endless conveyor being further provided with means for selectively controlling vertical displacement of said guide between a raised position allowing the conveyor to feed the piece of meat at the apparatus input and discharge the separated bone portion and deboned piece of meat at the apparatus output upon selective operation of said drive means, and a lowered position allowing the piece of meat to be disposed in said predetermined cutting position.

10. An apparatus for deboning a piece of meat having an elongate bone portion, said apparatus comprising:

holding means for maintaining the piece of meat in a predetermined cutting position wherein its elongate bone portion is substantially aligned with a longitudinal axis defined by said holding means; and a cutting tool including a pair of elongate shearing knives having respective base portions pivotally mounted on a support structure and having respective inwardly arcuate sections defining opposed cutting edges longitudinally extending over a length that is at least equal to the length of said elongated bone portion, said cutting tool further including means mounted on said structure for selectively controlling pivotal movement of said knives between a tool open position wherein the knives are in a spaced relationship allowing the piece of meat to be disposed in the predetermined cutting position and a tool closed position wherein the opposed cutting edges of the knives are brought into contact to separate the elongate bone portion from the deboned meat piece in a single tool movement following respective travels of the cutting edges through the meat piece according to convergent curvilinear cutting paths transversely extending about said longitudinal axis.

11. The apparatus according to claim 10, wherein said cutting tool further includes means for adjusting said predetermined cutting position relative to the pivots of said knives to provide adjustment of the curvilinear cutting paths traveled by said cutting edges.

12. The apparatus according to claim 1, wherein said holding means comprise:

elongate support means mounted on said support structure for receiving the piece of meat in said predetermined cutting position, said elongate support means defining said longitudinal axis;

press means mounted on the support structure for maintaining the piece of meat in said predetermined cutting position on the elongate support means.

13. The apparatus according to claim 12, wherein said elongate support means include first and second support elements providing first and second supporting surfaces for first and second adjacent sides of said piece of meat, said first and second support elements defining first and second elongate openings generally extending parallel to said longitudinal axis and being traversed by said curvilinear cutting paths to allow the movement of said knives.

14. The apparatus according to claim 12, wherein said press means include a plurality of press devices disposed along said longitudinal axis, each having a displaceable contacting element for pressing on a corresponding area of an exposed surface of said piece of meat to cause a corresponding generally opposed surface area of the meat piece to be pressed against said support means.

15. The apparatus according to claim 14, wherein each said press devices further having a pivoting member having a base portion pivotally mounted on said support structure and a free end being pivotally attached to said contacting element, and means for controlling pivotal movement of the member about its base portion between an open position allowing the piece of meat to be disposed in the predetermined cutting position on the support means and a closed position wherein the piece of meat is maintained in said predetermined cutting position.

16. The apparatus according to claim 10, wherein said apparatus further comprises transport means for feeding the piece of meat at an input of the apparatus and for discharging at an output thereof separated bone portion and deboned piece of meat.

17. The apparatus according to claim 16, wherein said transport means include an endless conveyor mounted on a vertically displaceable elongate guide and having drive means being coupled to a plurality of elements adapted to engage the piece of meat, said endless conveyor being further provided with means for selectively controlling the vertical displacement of said guide between a raised position allowing the conveyor to feed the piece of meat at the apparatus input and discharge the separated bone portion and deboned piece of meat at the apparatus output upon selective operation of said drive means, and a lowered position allowing the piece of meat to be disposed in said predetermined cutting position.

18. A method of deboning a piece of meat having an elongate bone portion, said method comprising the steps of:

maintaining the piece of meat in a predetermined cutting position wherein its elongate bone portion is substantially aligned with a longitudinal axis; and shearing the piece of meat according to a curvilinear cutting path transversely extending about said longitudinal axis to separate the elongate bone portion from the deboned meat piece in a single cutting movement.

19. A method of deboning a piece of meat having an elongate bone portion, said method comprising the steps of:

maintaining the piece of meat in a predetermined cutting position wherein its elongate bone portion is substantially aligned with a longitudinal axis; and shearing the piece of meat according to two convergent curvilinear cutting paths transversely extending about said longitudinal axis to separate the elongate bone portion from the deboned meat piece in a single cutting movement.

* * * * *